March 23, 1954  A. J. KRALOVETZ ET AL  2,672,804
GARDEN IMPLEMENT
Filed Dec. 26, 1947
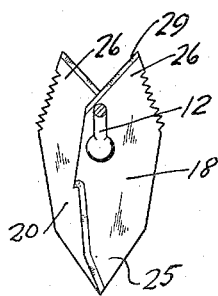
Fig. 6
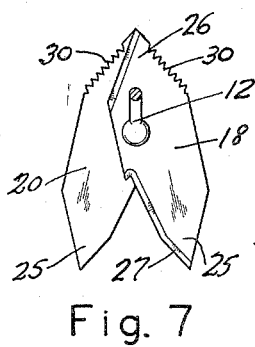
Fig. 7
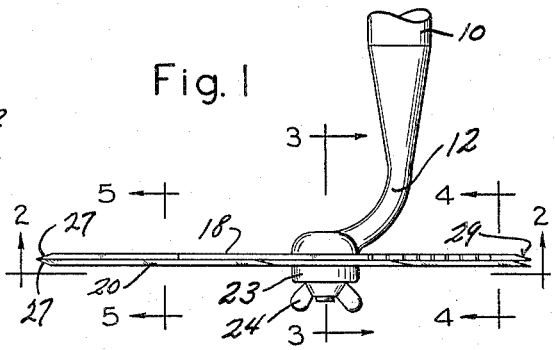
Fig. 1
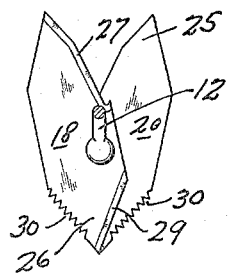
Fig. 8
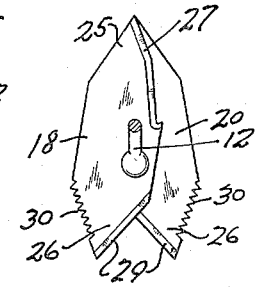
Fig. 9
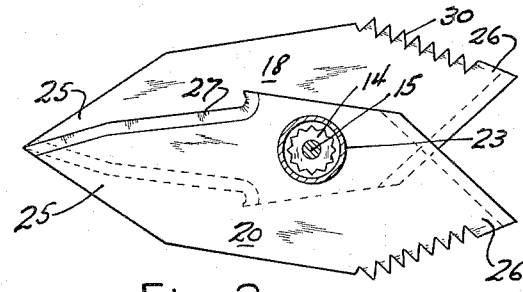
Fig. 2
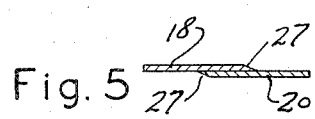
Fig. 5
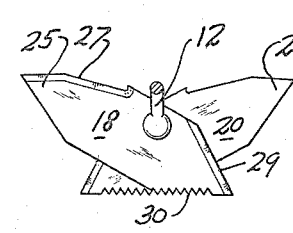
Fig. 10
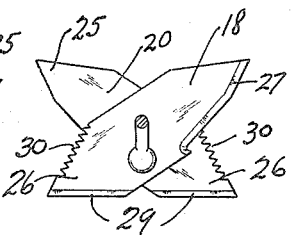
Fig. 11
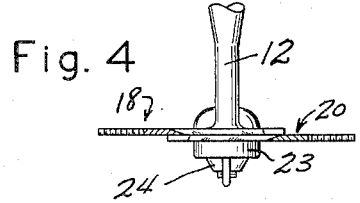
Fig. 4
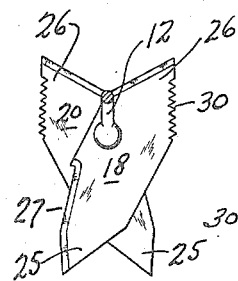
Fig. 12
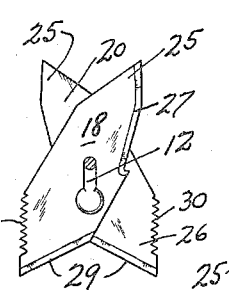
Fig. 13
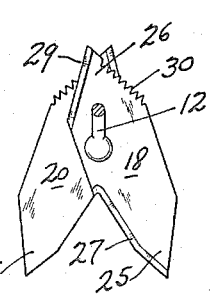
Fig. 14
Fig. 3
INVENTORS
Anton J. Kralovetz &
BY Eugene H. Simpson.
Eugene H. Simpson
ATTORNEY Patented Mar. 23, 1954

2,672,804

UNITED STATES PATENT OFFICE 2,672,804

GARDEN IMPLEMENT

Anton J. Kralovetz, Sheboygan, and Eugene H. Simpson, Milwaukee, Wis.; said Simpson assignor to said Kralovetz Application December 26, 1947, Serial No. 793,890

4 Claims. (Cl. 97—67)

This invention relates to garden implements and more particularly to a garden tool having a wide variety of uses.

In garden tools it is customary to have several implements to perform the operations of hoeing, weed cutting, cultivating, row digging, etc.

It is an object of the present invention to combine the functions of hoeing, cultivating, weeding and row digging into a single tool.

Another object is to provide a tool which is adjustable to a wide variety of uses.

A further object is to provide a tool which will be convenient to use.

Other objects will become apparent upon considering the following specification, which, when considered with the accompanying drawings illustrate a preferred form of the invention.

In the drawings:

Fig. 1 is a side view of the implement attached to a handle;

Figs. 2, 3, 4 and 5 are cross-sections of the implement taken on the line 2—2, 3—3, 4—4 and 5—5, respectively, of Fig. 1, looking in the direction of the arrows;

Fig. 6 is a plan view of the implement in position to dig a single trench or hoe hard ground;

Fig. 7 is a plan view of the implement adjusted to cover a row, to chop weeds or to dig a pair of parallel rows;

Fig. 8 shows the tool adjusted to dig a wide row;

Fig. 9 shows the tool in another row covering position;

Fig. 10 shows the implement adjusted to act as a cultivator;

Fig. 11 is a view of the implement adjusted to act as a hoe; and

Figs. 12, 13 and 14 show other adjusted positions of the implement.

In the drawings, the handle 10 has a goose-neck 12 formed on one end thereof. A star-shaped projection 14 extends at right angles to the goose-neck and is centered on a stud 15.

The implement comprises two similarly shaped pieces 18 and 20 having star like apertures 21 and 22 (Fig. 3) engageable over the projection 14 in any one of a plurality of positions such as is shown in Figs. 6 to 14, inclusive.

The blade 20 on the end of the stud 15 remote from the goose-neck 12 has a cup-shaped member 23 which may be secured on the outer side of the blade around the opening 22. The cup 23 has a concentric aperture through the bottom thereof through which the stud 15 passes. Both blades 18 and 20 may thus be held tightly in place by a wing nut 24.

If desired the cup 23 may be made separately from the blade 20.

Each blade 18 and 20 is formed with a relatively narrow V-shaped end 25 and a wide V-shaped end 26. The narrow V-shaped end 25 is provided with knife edges 27—27 on the opposite sides of the blades, so that, when assembled, they form a scissors edge, as seen in Figs. 5, 7, 8 and 14. In these positions large weeds may be cut readily and other clearing work done.

One edge 29 of the broad V-shaped end on each blade is likewise sharpened so that when the implement is used in the position shown in Fig. 11 it may be used for hoeing.

The opposite side 30 of the broad V-shaped end is formed with a toothed edge so that in the position of the blades shown in Fig. 10 the implement may be used for cultivating and breaking the surface ground.

The apertures 21 and 22 are placed closer to the wide V-shaped end 26 of the blades and are placed closer to one side of the blade than to the other in order to give a greater variety of settings for the implement.

The implement also serves a variety of other purposes, the nature of which will be apparent upon examining the drawings.

It will be understood that the form of the invention hereinbefore shown and described is to be taken merely as a preferred example thereof and that various changes in size, shape and arrangement of parts may be resorted to without departing from the spirit of the invention or the scope of the sub-joined claims.

That which is claimed as new and is desired to be secured by United States Letters Patent is:

1. A garden implement of the character described comprising, a handle, a goose-neck on the end of said handle, a pair of superposed polygonal identically shaped flat blades adjustably mounted on the end of said goose-neck for movement relative to each other about a common axis, corresponding ends of said blades at one end thereof defining a V-shaped point, one side of each blade at said V-shaped point being sharpened and the other side provided with a plurality of teeth to form a saw-tooth edge, whereby said blades may be optionally adjusted on said goose-neck either to bring the sharpened edges of said V-shaped points into alignment to provide a hoeing edge or to bring the saw-tooth edges into alignment to provide a saw-toothed cultivating edge.

2. The implement as defined in claim 1, wherein corresponding ends of said blades at the other end thereof similarly define a V-shaped point, one side at each of said last mentioned V-shaped points but on opposite faces of each blade formed with a single bevel knife-edge such that said blades may also optionally be angularly adjusted relative to each other to either bring said knife-edges in relation to define a scissor-like edge therebetween or the blades may be brought into overlapping relation at said last mentioned V-shaped points to provide a single V-point.

3. A garden implement of the character described comprising, a handle, a pair of superposed polygonal identically shaped flat blades adjustably mounted on the end of said handle for movement relative to each other about a common axis, corresponding ends of said blades at one end thereof defining a V-shaped point, one side of each blade at said V-shaped point being sharpened and the other side provided with a plurality of teeth to form a saw-tooth edge whereby said blades may be adjusted optionally on said handle either to bring the sharpened edges into alignment to form a hoeing edge or to bring the saw tooth edges into alignment to provide a saw-toothed cultivating edge.

4. The implement as defined in claim 3, wherein corresponding ends of said blades at the other end thereof similarly define a V-shaped point, one side at each of said last mentioned V-shaped points but on opposite faces of each blade formed with a single bevel knife-edge such that said blades may also optionally be angularly adjusted relative to each other to either bring said knife-edges in relation to define a scissor-like edge therebetween or the blades may be brought into overlapping relation at said last mentioned V-shaped points to provide a single V-point.

ANTON J. KRALOVETZ.
EUGENE H. SIMPSON.

References Cited in the file of this patent

UNITED STATES PATENTS

| Number | Name | Date |
| --- | --- | --- |
| 18,979 | Lothrop | Dec. 29, 1857 |
| 83,866 | Lyman | Nov. 10, 1868 |
| 488,647 | Barnes | Dec. 27, 1892 |
| 514,419 | Evans | Feb. 6, 1894 |
| 551,078 | Dewberry | Dec. 10, 1895 |
| 634,946 | Kieser | Oct. 17, 1899 |
| 642,140 | Luke | Jan. 30, 1900 |
| 797,840 | Choate | Aug. 22, 1905 |
| 1,156,937 | Sinnott | Oct. 19, 1915 |
| 2,184,968 | Woodruff | Dec. 26, 1937 |
| 2,251,048 | Garland | July 29, 1941 |

FOREIGN PATENTS

| Number | Country | Date |
| --- | --- | --- |
| 2,128 | Great Britain | Jan. 31, 1901 |
| 10,485 | Australia | Dec. 9, 1932 |
| 37,429 | Switzerland | July 13, 1906 |